United States Patent
Kitamura et al.

(10) Patent No.: US 8,534,333 B2
(45) Date of Patent: Sep. 17, 2013

(54) PNEUMATIC TIRE

(75) Inventors: Takamasa Kitamura, Kanagawa (JP); Shigeki Ito, Osaka (JP); Kenichi Kitano, Osaka (JP); Takeshi Inohara, Osaka (JP)

(73) Assignees: The Yokohama Rubber Co., Ltd., Tokyo (JP); Matsumoto Yushi-Seiyaku Co., Ltd., Osaka (JP)

( * ) Notice: Subject to any disclaimer, the term of this patent is extended or adjusted under 35 U.S.C. 154(b) by 433 days.

(21) Appl. No.: 12/810,774

(22) PCT Filed: Feb. 13, 2009

(86) PCT No.: PCT/JP2009/052409
§ 371 (c)(1),
(2), (4) Date: Jun. 25, 2010

(87) PCT Pub. No.: WO2009/102017
PCT Pub. Date: Aug. 20, 2009

(65) Prior Publication Data
US 2010/0288406 A1 Nov. 18, 2010

(30) Foreign Application Priority Data
Feb. 13, 2008 (JP) .................. 2008-031595

(51) Int. Cl.
*B60C 11/00* (2006.01)
(52) U.S. Cl.
USPC ................ 152/209.1; 525/332.8; 525/942

(58) Field of Classification Search
USPC ............................. 152/209.1; 525/332.8, 942
See application file for complete search history.

(56) References Cited

FOREIGN PATENT DOCUMENTS

| JP | 10-316801 A | | 12/1998 |
|---|---|---|---|
| JP | 2003-105138 A | * | 4/2003 |
| JP | 2003-105138 A | | 4/2003 |
| JP | 2004-091745 A | | 3/2004 |
| JP | 2004-359758 A | * | 12/2004 |
| JP | 2004-359758 A | | 12/2004 |
| JP | 2007-284645 A | * | 11/2007 |
| JP | 2007-302850 A | * | 11/2007 |
| JP | 2007-302850 A | | 11/2007 |

\* cited by examiner

*Primary Examiner* — Robert D. Harlan
(74) *Attorney, Agent, or Firm* — Global IP Counselors, LLP

(57) ABSTRACT

A tread rubber is made of a rubber composition containing 100 pbw of a diene rubber, 30 to 100 pbw of a reinforcing filler including at least 10 pbw of silica, and 1 to 20 pbw of microcapsules each encapsulating a heat-expandable substance. A sulfur-containing silane coupling agent is mixed in the rubber composition in an amount of 3 to 15 wt. % based on the weight of the silica. A shell material of each microcapsule is made of a thermoplastic resin which essentially contains a nitrile monomer. A vapor pressure of the heat-expandable substance is 1.4 to 3.0 MPa at 150° C. An average diameter of the microcapsules is 20 to 30 μm before vulcanization of the rubber composition. An average diameter of the microcapsules expanded due to the vulcanization is 40 to 80 μm. The tread rubber has a proportion of a cell-occupying area of 5 to 30%.

8 Claims, No Drawings

PNEUMATIC TIRE

CROSS-REFERENCE TO RELATED APPLICATIONS

This U.S. National stage application claims priority under 35 U.S.C.§119(a) to Japanese Patent Application No. 2008-031595, filed in Japan on Feb. 13, 2008, the entire contents of which are hereby incorporated herein by reference.

TECHNICAL FIELD

The present invention relates to a pneumatic tire. More specifically, the present invention relates to a pneumatic tire whose frictional force on ice is improved by satisfactorily forming resin-encapsulated cells from heat-expandable microcapsules, even when a tread rubber contains silica to retain rubber flexibility at low temperature.

BACKGROUND ART

Various configurations are available for improving the frictional force on ice of a pneumatic tire (studless tire) for ice-bound or snow-covered roads. Here, there is one configuration in which numerous cells are formed in a tread rubber. In this configuration, the absorbing and removing of a water film on an ice surface when the tread comes in contact with the ice surface; and releasing of the water by centrifugal force when the tread is separated from the ice surface are repeated to improve the frictional force on ice. Japanese patent Publication No. H10-316801 proposes, as a method for forming such cells, that a rubber composition for a tire tread contains heat-expandable microcapsules, and the microcapsules are expanded by heat during the vulcanization step to form resin-encapsulated cells.

Additionally, in a studless tire, the hardness of the tread rubber is kept low even at low temperature so that an adhesion property to an ice surface is enhanced, thereby improving the frictional force on ice. Here, the rubber flexibility can be secured at low temperature when the tread rubber contains silica as a method for improving the frictional force on ice. Nevertheless, the studless tire, in which micro-sized resin-encapsulated cells are formed when the tread rubber contains heat-expandable microcapsules as described above, has the following problem. In a case where the tread rubber contains silica, shell materials of the respective microcapsules are broken by silica while the rubber composition is being kneaded, and thereby the microcapsules cannot expand during vulcanization molding. For this reason, desired resin-encapsulated cells cannot be formed, and thereby satisfactory frictional force on ice cannot be obtained.

Japanese Patent Application Publication Ne. 2003-105138 proposes the following method as a countermeasure against this problem. Specifically, the kneading of the rubber composition is achieved through the first and second operations. First, rubber and silica are kneaded as the first operation. Then, microcapsules are mixed into the mixture of rubber and silica as the second operation. Nevertheless, even this method cannot fully prevent the microcapsules from breaking during the mixing of the microcapsules. For this reason, the method needs to be further improved.

DISCLOSURE OF THE INVENTION

Problem to be Solved by the Invention

An object of the present invention is to provide a pneumatic tire whose frictional force on ice is improved by satisfactorily forming resin-encapsulated cells from heat-expandable microcapsules, even when a tread rubber contains silica to retain rubber flexibility at low temperature.

Means for Solving the Problems

In order to achieve the above object, the present invention includes a pneumatic tire whose tread rubber is made from a rubber composition containing 100 parts by weight of a diene rubber, 30 to 100 parts by weight of a reinforcing filler including at least 10 parts by weight of silica, and 1 to 20 parts by weight of microcapsules each encapsulating a heat-expandable substance, characterized in that: the rubber composition contains a sulfur-containing silane coupling agent in an amount of 3 to 15 wt. % based on the weight of the silica; a thermoplastic resin forming a shell material of each microcapsule is obtained by polymerizing together a nitrile monomer (I) in a major proportion and a monomer (II) having an unsaturated double bond and a carboxyl group in its molecule; the heat-expandable substance has a vapor pressure of set at 1.4 to 3.0 MPa at 150° C.; the microcapsules have an average particle diameter of 20 to 30 µm before vulcanization of the rubber composition; the microcapsules as expanded due to the vulcanization have an average particle diameter of 40 to 80 µm; and thus, the tread rubber has a proportion of a cell-occupying area of 5 to 30%.

It is preferable that the shell material of each microcapsule is made of the thermoplastic resin which further contains, as a monomer, a monomer (III) having at least two polymerizable double bonds and/or a copolymerizable monomer (IV).

It is preferable that the nitrile monomer (I) is at least one selected from acrylonitrile, methacrylonitrile, α-chloroacrylonitrile, α-ethoxy acrylonitrile and fumaronitrile.

It is preferable that the monomer (II) having an unsaturated double bond and a carboxyl group in its molecule is at least one selected from an acrylic acid, a methacrylic acid, an itaconic acid, a maleic acid, a fumaric acid and a citraconic acid.

It is preferable that the monomer (III), which is an optional ingredient, and which has at least two polymerizable double bonds, is at least one selected from divinylbenzene, divinylnaphthalene, allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, polyethylene glycol (PEG#200) di(meth)acrylate with a weight average molecular weight of 200, polyethylene glycol (PEG#400) di(meth)acrylate with a weight average molecular weight of 400, 1,6-hexanediol (meth)acrylate, and trimethylolpropane trimethacrylate.

It is preferable that the copolymerizable monomer (IV), which is an optional ingredient, is at least one selected from: vinylidene chloride; vinyl acetate; (meth)acrylate esters including methyl (meth)acrylate, ethyl (meth)acrylate, n-butyl (meth)acrylate, isobutyl (meth)acrylate and t-butyl (meth) acrylate; styrene; styrene sulfonate; α-methyl styrene; chlorostyrene; acrylamide; a substituted acrylamide; methacrylamide; and a substituted methacrylamide.

It is preferable that the heat-expandable substance is at least one selected from the group consisting of isoalkanes and normal alkanes.

It is preferable that the sulfur-containing silane coupling agent is at least one selected from bis-(3-triethoxysilylpropyl) tetrasulfide, bis(3-triethoxysilylpropyl)disulfide, and 3-trimethoxysilylpropyl benzothiazole tetrasulfide.

Effects of the Invention

In the pneumatic tire according to the present invention, when the tread rubber is made of a rubber composition obtained by mixing together 100 parts by weight of a diene rubber, 30 to 100 parts by weight of a reinforcing filler including at least 10 parts by weight of silica, and 1 to 20 parts by weight of heat-expandable microcapsules, the average particle diameter of the microcapsules is set at as relatively small as 20 to 30 μm. This makes it difficult for the microcapsules to break even though silica exists together with the microcapsules while the rubber composition is mixed. In addition, the shell material of each microcapsule is made of a thermoplastic resin which is obtained by polymerizing together a nitrile monomer (I) in a major proportion and a monomer (II) having an unsaturated double bond and a carboxyl group in its molecule. Thereby, the shell material of each microcapsule is made flexible. Furthermore, the heat-expandable substance encapsulated in the shell material has the vapor pressure of 1.4 to 3.0 MPa at 150° C. This raises a heat expansion coefficient with which the shell material of each microcapsule expands during vulcanization, and accordingly increases the average particle diameter of the microcapsules to 40 to 80 μm after the vulcanization, even though the average particle diameter of the microcapsules is small before the vulcanization. Thereby, the tread rubber has the proportion of a cell-occupying area of 5 to 30%. This enhances the frictional force on ice of the pneumatic tire. Moreover, a sulfur-containing silane coupling agent is mixed into the rubber composition in an amount of 3 to 15 wt. % based on the weight of silica. This enhances the dispersibility of the silica, and the mixture of the silica accordingly enhances the maintenance of the flexibility of the tread rubber at low temperature. Thereby, it is possible to achieve both the enhancement of the maintenance of the flexibility of the tread rubber and the frictional force on ice.

BEST MODE FOR CARRYING OUT THE INVENTION

Any diene rubber may be used as the diene rubber according to the present invention, as long as the diene rubber can be used as a rubber compound for the tread. Examples of the diene rubber include natural rubber, isoprene rubber, butadiene rubber, various styrene butadiene rubbers, acrylonitrile butadiene rubber, and butyl rubber. Among these rubbers, natural rubber, butadiene rubber, styrene butadiene rubber are suitable for the tread rubber of the studless tire. These diene rubbers may be used singly or in combination.

A tread rubber composition contains: 100 parts by weight of the diene rubber; and 30 to 100 parts by weight, preferably 40 to 80 parts by weight, of reinforcing filler including at least 10 parts by weight of silica. In a case where the amount of reinforcing filler mixed in the tread rubber composition is less than 30 parts by weight, the abrasion resistance reduces. On the other hand, in a case where the amount of reinforcing filler mixed in the tread rubber composition is more than 100 parts by weight, it is difficult for the studless tire to maintain the requested flexibility. Examples of reinforcing filler other than silica include carbon black, clay, calcium carbonate, talc, mica, titanium oxide, and alumina. A combined use of carbon black and silica is particularly suitable as the tread rubber composition.

The mixture of silica in the tread rubber composition enables the tread rubber to maintain its flexibility at low temperature, and enhances the tread rubber adhesion to ice surfaces. Accordingly, the mixture raises the frictional force on ice of the tread rubber. The amount of silica mixed in the tread rubber composition may be more than 10 parts by weight, preferably 10 to 90 parts by weight, and more preferably 10 to 70 parts by weight, on the basis of 100 parts by weight of diene rubber. In a case where the amount of silica mixed in the tread rubber composition is less than 10 parts by weight, the rubber cannot maintain its flexibility at low temperature. No specific restrictions are imposed on the types of the silica. Any type of silica, which is usually used in a rubber composition, may be used as the silica to be mixed in the tread rubber composition. Examples of the silica include wet-processed silica, dry-processed silica and surface-treated silica.

In the present invention, the sulfur-containing silane coupling agent is mixed in the tread rubber composition in an amount of 3 to 15 wt. %, and preferably 5 to 10 wt. %, on the basis of the weight of the silica mixed in the tread rubber composition. The mixture of the sulfur-containing silane coupling agent in the tread rubber composition improves the dispersibility of the silica, and enhances the reinforcement of the rubber. Accordingly, it is possible to enhance the flexibility of the rubber composition at low temperature. In a case where the silane coupling agent is mixed in the tread rubber composition in an amount of less than 3 wt. %, the dispersibility of the silica decreases. Accordingly, the effect of enhancement of the rubber flexibility at low temperature cannot be expected. On the other hand, in a case where the silane coupling agent is mixed in the tread rubber composition in an amount of more than 15 wt. %, the silane coupling agent is polymerized with itself. This makes it impossible to obtain the desired effect.

Any coupling agent may be used as the sulfur-containing silane coupling agent, as long as the coupling agent can be used for the rubber composition into which silica is mixed. Examples of the sulfur-containing silane coupling agent include bis-(3-triethoxysilylpropyl)tetrasulfide, bis-(3-triethoxysilylpropyl)disulfide, 3-trimethoxysilylpropyl benzothiazole tetrasulfide, γ-mercaptopropyltriethoxy-silane, and 3-octanoylthiopropyl triethoxysilane.

The heat-expandable microcapsules comprise a shell material made of a thermoplastic resin and a heat-expandable substance encapsulated in the shell material. For this reason, once the microcapsules included in the rubber composition of an unvulcanized tire are heated when the unvulcanized tire is vulcanized, the heat-expandable substance encapsulated in each shell material expands, and the particle diameter of each shell material increases. Accordingly, numerous resin-encapsulated cells are formed in the tread rubber. The resin-encapsulated cells efficiently absorb and remove water films which occur on the surface of ice, and bring about a micro-edge effect. This enhances the frictional force on ice of the pneumatic tire.

The amount of microcapsules to be mixed in the rubber composition may be 1 to 20 parts by weight, and preferably 2 to 10 parts by weight, on the basis of 100 parts by weight of the diene rubber. In a case where the amount of microcapsules mixed in the rubber composition is less than 1 part by weight, the volume of the resin-encapsulated cells in the tread rubber is insufficient, and the pneumatic tire cannot sufficiently obtain the frictional force on ice. Conversely, in a case where the amount of microcapsules mixed in the rubber composition is more than 20 parts by weight, the abrasion resistance of the tread rubber decreases.

The average particle diameter of the microcapsules used for the present invention is 20 to 30 μm before the vulcanization. In a case where the average particle diameter of the microcapsules before the vulcanization, namely the average particle diameter of the pre-expanded microcapsules, is larger than 30 μm before the expansion, the microcapsules are easily broken by the silica when the rubber composition and the microcapsules are kneaded together. This makes it impossible to form a sufficient quantity of resin-encapsulated cells in the tread rubber. On the other hand, in a case where the average particle diameter of the microcapsules is less than 20 μm before the expansion, the microcapsules are less broken by the silica when the rubber composition and the microcapsules are mixed together. However, the particle diameter of each microcapsule expanded by heating cannot be secured sufficiently. This makes it impossible to obtain the desired frictional force on ice.

Note that, in the present invention, the average particle diameter of the pre-expanded microcapsules is a value which is found by a dry measurement using a laser diffraction-type particle size distribution measuring apparatus (HEROS&RODOS manufactured by Sympatec Corporation) under a condition that the distribution pressure and degree of vacuum in the distribution unit are set at 5.0 bar and 5.0 mbar, respectively.

The average particle diameter of the microcapsules in the pre-vulcanized tread rubber increases to 40 to 80 μm due to their expansion after the vulcanization. Because the average particle diameter of the post-expanded microcapsules is larger than 40 μm, the volume of the resin-encapsulated cells formed in the tread rubber can be secured sufficiently. This enhances the effect of absorbing and removing water films, and improves the micro-edge effect. Accordingly, it is possible to obtain the desired frictional force on ice. On the contrary, in a case where the average particle diameter of the post-expanded microcapsules exceeds 80 μm, the area of contact between the rubber and ice decreases. This makes the performance insufficient in a low temperature range in which no water film occurs.

Note that this description defines the average particle diameter of the post-expanded microcapsules as an average particle diameter measured through observing the cross section of the tread rubber by use of a scanning electron microscope (SEM).

The microcapsules used for the present invention is configured in that, as described above, their average particle diameter is kept small before the vulcanization, and their average particle diameter is increased after their expansion caused by the vulcanization. To this end, the shell materials of the respective microcapsules are made in a way that the shell materials are flexible, and a substance which produces a predetermined vapor pressure during the heat expansion is used as the heat-expandable substance. This combined use of the shell materials and the heat-expandable substance makes the expansion coefficient large during the heating even though the average particle diameter of the pre-expanded microcapsules is small. This accordingly makes it possible to form the resin-encapsulated cells with the desired size in the post-vulcanized tread rubber.

The thermoplastic resin forming the shell materials is obtained by polymerizing together a nitrile monomer (I) in a major proportion and a monomer (II) having an unsaturated double bond and a carboxyl group in its molecule. In addition, a monomer (III) having at least two polymerizable double bonds and/or a copolymerizable monomer (IV) may be added during the copolymerization for the purpose of enhancing the heat resistance and controlling the expansion characteristic.

Examples of the nitrile monomer (I), which can be used for the present invention, include acrylonitrile, methacrylonitrile, α-chloroacrylonitrile, α-ethoxyacrylonitrile, fumaronitrile and their respective mixtures. It is desirable that the nitrile monomer (I) should be particularly acrylonitrile and/or methacrylonitrile. In addition, a percentage of the monomer (I) in the copolymerization may be preferably 30 to 97 wt. %, more preferably 35 to 95 wt. %, and most preferably 45 to 90 wt. %. Otherwise, the percentage of the monomer (I) in the copolymerization may be more preferably 40 to 96 wt. %, and far more preferably 50 to 90 wt. %.

Examples of the monomer (II) having an unsaturated double bond and a carboxyl group in its molecule include acrylic acid (AA), methacrylic acid (MAA), intaconic acid, maleic acid, fumaric acid, citraconic acid, and their respective mixtures. A percentage of the monomer (II) in the copolymerization may be preferably 3 to 70 wt. %, more preferably 5 to 65 wt. %, and most preferably 10 to 55 wt. %. Otherwise, the percentage of the monomer (II) in the copolymerization may be more preferably 4 to 60 wt. %, and far more preferably 10 to 50 wt. %. In a case where the percentage of the monomer (II) in the copolymerization is less than 3 wt. %, it is likely that the expandability may reduce in a high temperature range.

The monomer (III) having at least two polymerizable double bonds may be additionally copolymerized with the monomer (I) and the monomer (II) for the purpose of enhancing the heat resistance or for the purpose of controlling the expansion performance which is exhibited in the high temperature range. Examples of the monomer (III) having at least two polymerizable double bonds include: an aromatic divinyl compound such as divinylbenzene and divinylnaphthalene; an allyl methacrylate; triacrylformal; triallyl isocyanate; ethylene glycol di(meth)acrylate; diethylene glycol di(meth) acrylate; triethylene glycol di(meth)acrylate; 1,4-butanediol di(meth)acrylate; 1,9-nonanediol di(meth)acrylate; polyethylene glycol (PEG#200) di(meth)acrylate with a weight average molecular weight of 200; polyethylene glycol (PEG#400) di(meth)acrylate with a weight average molecular weight of 400; 1,6-hexanediol (meth)acrylate; trimethylolpropane trimethacrylate; and their respective mixtures. The monomer (III) is an arbitrary component. When the monomer (III) is added to the thermoplastic resin, the percentage of the monomer (III) in the copolymerization may be preferably 0 to 7 wt. %, more preferably 0.05 to 5 wt. %, and most preferably 0.2 to 3 wt. %. When the percentage of the monomer (III) in the copolymerization is set at any one of the above-mentioned ranges, it is possible to enhance the heat resistance, and concurrently to improve the expansion performance which is exhibited in the high temperature range.

The copolymerizable monomer (IV) may be additionally copolymerized with the monomer (I) and the monomer (II) for the purpose of controlling the expansion characteristic. Examples of the copolymerizable monomer (IV) include: vinylidene chloride; vinyl acetate; (meth)acrylate esters such as methyl(meth)acrylate, ethyl(meth)acrylate, n-butyl(meth) acrylate, isobutyl(meth)acrylate, and t-butyl(meth)acrylate; styrene; styrene sulfonate and its sodium salt; styrene monomers such as α-methyl styrene and chlorostyrene; acrylamide; a substituted acrylamide; methacrylamide; and a substituted methacrylamide. The monomer (IV) is an arbitrary component. When the monomer (IV) is added to the thermoplastic resin, the percentage of the monomer (IV) in the copolymerization may be preferably 0 to 25 wt. %, more preferably 0.05 to 20 wt. %, and most preferably 1 to 15 wt. %.

The thermoplastic resin forming the shell material of each microcapsule can be obtained through suspension polymerization in the usual way. A polymerization initiator is an oil-soluble peroxide or azobis compound. It is desirable that the half-life period of the polymerization initiator should be 1 to 25 hours at reaction temperature. It is more desirable that the half-life period of the polymerization initiator should be 5 to 20 hours at reaction temperature. Examples of the polymerization initiator include: peroxide compounds such as dialkyl peroxides, diacyl peroxides, peroxy esters and peroxy dicarbonates; and azo compounds.

A substance which satisfies the following conditions is used as the heat-expandable substance encapsulated in each microcapsule. One condition is that the substance has a characteristic in which the substance vaporizes or expands due to heat. The other condition is that the vapor pressure of the substance is 1.4 to 3.0 MPa at 150° C. It is desirable that the vapor pressure of the substance should be 1.5 to 2.8 MPa at 150° C. If the vapor pressure of the substance is lower than 1.4 MPa at 150° C., the expansion coefficient cannot be increased in a case where an average particle diameter of the pre-expanded microcapsules is set at a small value. This makes it impossible to form the resin-encapsulated cells in a desirable size. On the other hand, if the vapor pressure of the substance is higher than 3.0 MPa at 150° C., the process stability decreases undesirably. Note that the vapor pressure of the heat-expandable substance at 150° C. is a value approximated by the Rankin-Dupré formula of vapor pressure.

No specific restriction is imposed on such a heat-expandable substance, as long as the heat-expandable substance has the above-mentioned vapor pressure. For instance, at least one selected from hydrocarbons such as isoalkanes and normal alkanes can be shown as an example of the heat-expandable substance. Examples of isoalkanes include isobutane, isopentane, 2-methylpentane, 2-methylhexane, and 2,2,4-trimethylpentane. Examples of normal alkanes include n-butane, n-propane, n-hexane, n-heptane and n-octane. These hydrocarbons may be used singly or in combination. Even a substance other than the above-mentioned substances may be used by mixing this substance with at least one of these hydrocarbons as long as the vapor pressure of the mixture of the substance is 1.4 to 3.0 MPa at 150° C.

A desirable mode of the heat-expandable substance is the dissolution of a hydrocarbon, which is gaseous at normal temperature, in another hydrocarbon which is fluid at normal temperature. The heat-expandable substance can obtain a sufficient expansion force from use of the mixture of these hydrocarbons from a low temperature range through a high temperature range within a temperature range (150 to 190° C.) applied to the vulcanized molding of the unvulcanized tire.

The average particle diameter of the microcapsules used for the present invention is smaller than that of conventional microcapsules. The first step of a method of manufacturing microcapsules of this kind is to prepare a fluid dispersion in which, as oily droplets, an oily mixture containing the monomers, the polymerization initiator, the heat-expandable substance and the like is dispersed in a water-based dispersion medium. In this respect, in a case where the heat-expandable substance is a hydrocarbon which is gaseous at normal temperature, it is desirable that the preparation of the fluid dispersion should be achieved with the manufacturing process fully cooled. Subsequently, this fluid dispersion is subjected to suspension polymerization while heated by the conventional method which has been publicly known. Thereby, the microcapsules are obtained. In addition, for the purpose of obtaining microcapsules with an average particle diameter of 20 to 30 μm, it is desirable that a continuous high-speed high-shear-type agitating distributor should be used as in the case described in Japanese patent application Kokai publication No. Hei 7-96167.

Inorganic particles of silica, magnesium hydroxide or the like are used as a dispersion stabilizer in the water-based dispersion medium. In addition, a condensation product of diethanolamine and aliphatic dicarboxylic acid, polyvinyl pyrrolidone, methylcellulose, polyethylene oxide, polyvinyl alcohol, any one of various emulsifiers, or the like may be used as a dispersion stabilizing adjuvant.

In the pneumatic tire according to the present invention, a proportion of an area occupied by the cells in the post-vulcanized tread rubber is set at 5 to 30%. It is desirable that the proportion should be set at 7 to 25%. In a case where the proportion of the area occupied by the cells in the tread rubber is lower than 5%, it is impossible to fully obtain the effect of absorbing and removing water films on the surface of ice because of the small proportion of the resin-encapsulated cells in the tread rubber. In addition, in a case where the proportion of the area occupied by the cells in the tread rubber exceeds 30%, the proportion of the volume occupied by the resin-encapsulated cells in the tread rubber is too large. This reduces the area of the contact between the rubber and ice, and the performance becomes insufficient in the low temperature range in which no water film occurs.

Note that this description defines the proportion of the area occupied by the cells as an average value obtained by: observing a cross section of the tread rubber while magnifying the cross section 165 times; and measuring an proportion of an area occupied by cross sections of all the respective resin-encapsulated cells present in the observed surface for each of 10 fields of view by subjecting the observed surface to image processing.

Additives may be mixed in the rubber composition of which the tread rubber is made. The additives include a regular vulcanizing or cross-linking agent; a vulcanization accelerator or cross-linking promoter; various oils; an antioxidant; a plasticizer (softener); and other additives which are usually mixed in regular rubber. The amount of these additives may be the same as the conventional regular amount, as long as this amount does not contradict the purpose of the present invention.

The pneumatic tire obtained from the present invention is suitable as a studless tire. That is because: its tread rubber contains silica, and thus maintains its flexibility at low temperature, as well as accordingly increases the adhesion of the pneumatic tire to the surface of ice; and the satisfactory resin-wall cells are formed in the tread rubber by use of the heat-expandable microcapsules, and the tread rubber can thus absorb and remove water films on the surface of ice, as well as the tread rubber can enhance the frictional force on ice.

Hereinbelow, the present invention will be further described by use of examples. However, the scope of the present invention is not limited to these examples.

EXAMPLES

Preparation of Microcapsules

Microcapsules of types 1 to 4 were made by use of the below-described preparation method. Table 1 shows the characteristics of the obtained microcapsules of the four types 1 to 4 (microcapsule-1 to microcapsule-4).

Microcapsules of Type 1

As water-based materials, 80 grams of colloidal silica with a solid content of 40%, 1.5 grams of a condensate of diethanolamine adipic acid and 150 grams of sodium chloride were mixed together with 500 grams of ion-exchanged water being added to the materials. Subsequently, the pH of the resultant water-based mixture was adjusted to 3.5. Thereby, an aqueous dispersion medium was produced. As oil-based materials, 70 grams of acrylonitrile, 70 grams of methacrylonitrile, 70 grams of methacrylic acid, 3 grams of ethylene glycol dimethacrylate, 1 gram of azobis(2,4-dimethylvaleronitrile) were mixed together into a homogenized monomer mixture. As heat-expandable materials, 15 grams of isobutane and 35 grams of 2-methylpentane were further added to the resultant homogenized monomer mixture. Thereby, the oil-based mixture was made.

The water-based dispersion medium and the oil-based mixture were mixed together. The obtained liquid mixture was dispersed in a homogenizing mixer (a T.K. Homo Mixer manufactured by Tokushu Kikai Kogyo) for 5 minutes with a number of revolutions being set at 9000 rpm. Thereby, a suspension was prepared. This suspension was charged into an autoclave, and was subjected to nitrogen substitution therein. Thereafter, the resultant suspension was subjected to a reaction at a reaction temperature of 60° C. for 8 hours. This reaction was achieved at a reaction pressure of 0.5 MPa and at a stirring rate of 350 rpm.

The thus-obtained microcapsules of type 1 (microcapsule-1 in table 1) encapsulated a heat-expandable substance whose vapor pressure was 2.2 MPa at 150° C. when the vapor pressure was found by calculating the mole fraction by use of a vapor pressure approximated on the basis of the Rankin-Dupré formula of vapor pressure. In addition, the average particle diameter of the obtained microcapsules of type 1 was 25 µm.

Microcapsules of Type 2

The microcapsules of type 2 were produced by the same procedure as in the microcapsules of type 1, except in that the heat-expandable materials were changed to 30 grams of isobutane and 20 grams of 2-methylpentane.

added to the materials. Subsequently, the pH of the resultant water-based mixture was adjusted to 3.5. Thereby, a water-based dispersion medium was produced. As oil-based materials, 70 grams of acrylonitrile, 70 grams of methacrylonitrile, 70 grams of methacrylic acid, 3 grams of ethylene glycol dimethacrylate, 1 gram of azobis(2,4-dimethylvaleronitrile) were mixed together into a homogenized monomer mixture. The monomer mixture was charged into the autoclave together with 20 grams of isopentane and 30 grams of 2-methylpentane as heat-expandable materials. Thus, the monomer mixture and the heat-expandable materials were mixed together in the autoclave. Thereafter, the water-based dispersion medium was charged into the autoclave. Hence, the resultant mixture and the water-based dispersion medium were agitated in the autoclave at a stirring rate of 700 rpm for 5 minutes. Subsequently, the agitated matter was subjected to nitrogen substitution, and was afterward subjected to reaction at a reaction temperature of 60° C. for 8 hours. The reaction was achieved at a reaction pressure of 0.5 MPa and at a stirring rate of 350 rpm.

The thus-obtained microcapsules of type 4 (microcapsule-4 in table 1) encapsulated a heat-expandable substance whose vapor pressure was 1.3 MPa at 150° C. when the vapor pressure was found by calculating the mole fraction by use of a vapor pressure approximated on the basis of the Rankin-Dupré formula of vapor pressure. In addition, the average particle diameter of the obtained microcapsules of type 4 was 40 µm.

TABLE 1

|  |  | Microcapsule-1 | Microcapsule-2 | Microcapsule-3 | Microcapsule-4 |
|---|---|---|---|---|---|
| Average particle diameter [µm] | | 25 | 25 | 25 | 40 |
| Composition of heat-expandable material | Isobutane [wt. %] | 30 | 60 | | |
| | Isopentane [wt. %] | | | 40 | 40 |
| | 2-methylpentane [wt. %] | 70 | 40 | 60 | 60 |
| Vapor pressure of heat-expandable material (150° C., calculated by mole fraction) [MPa] | | 2.2 | 3.2 | 1.3 | 1.3 |

The thus-obtained microcapsules of type 2 (microcapsule-2 in table 1) encapsulated a heat-expandable substance whose vapor pressure was 3.2 MPa at 150° C. when the vapor pressure was found by calculating the mole fraction by use of a vapor pressure approximated on the basis of the Rankin-Dupré formula of vapor pressure. In addition, the average particle diameter of the obtained microcapsules of type 2 was 25 µm.

Microcapsules of Type 3

The microcapsules of type 3 were produced by the same procedure as in the microcapsules of type 1, except in that: the heat-expandable materials were changed to 20 grams of isopentane and 30 grams of 2-methylpentane; and the number of revolutions of the homogenizing mixer was changed to 8000 rpm.

The thus-obtained microcapsules of type 3 (microcapsule-3 in table 1) encapsulated a heat-expandable substance whose vapor pressure was 1.3 MPa at 150° C. when the vapor pressure was found by calculating the mole fraction by use of a vapor pressure approximated on the basis of the Rankin-Dupré formula of vapor pressure. In addition, the average particle diameter of the obtained microcapsules of type 3 was 25 µm.

Microcapsules of Type 4

As water-based materials, 45 grams of colloidal silica with a solid content of 40%, 1 gram of a condensate of diethanolamine adipic acid and 150 grams of sodium chloride were mixed together with 500 grams of ion-exchanged water being Preparation of Rubber Composition For each of the mixtures shown in Table 2, the components, excluding the vulcanization accelerator, sulfur and microcapsules, were kneaded in an internal Banbury mixer with a volume of 1.7 liters for 5 minutes. When the temperature reached 155±5° C., the kneaded matter was discharged from the Banbury mixer, and was thus cooled at room temperature. Thereafter, the vulcanization accelerator, sulfur and microcapsules were mixed into the kneaded matter. Subsequently, the mixture was kneaded in the Banbury mixer. Thereby, 10 types of rubber composition (Examples 1 to 4 and Comparative Example 1 to 6) were prepared.

The 10 types of rubber composition (Examples 1 to 4 and Comparative Example 1 to 6) thus obtained were press-vulcanized in the respective predetermined molds at 160° C. for 20 minutes. Thereby, vulcanized rubber specimens were prepared. For each vulcanized rubber specimen thus obtained, the proportion of an area occupied by cells, the average particle diameter of post-expanded microcapsules, the difference in hardness of the rubber at low temperature, the frictional force on ice and the abrasion resistance were evaluated by use of the below-shown methods.

Proportion of Area Occupied by Cells

A cross section of each obtained vulcanized rubber specimen was observed while magnified 165 times. By use of an image processing apparatus (NEXUS6400 manufactured by Kashiwagi Factory), a proportion of an area occupied by cells in each unit area was measured for each of 10 fields of view. Thus, the average of the proportions was found. Table 2 shows the obtained result.

Average Particle Diameter of Post-Expanded Microcapsules

An average value of average particle diameters of post-expanded microcapsules was found by observing the cross section of the obtained vulcanized rubber specimen by use of a scanning electron microscope (SEM). Table 2 shows the obtained result.

Difference in Hardness of Rubber Between Low and Normal Temperatures (Difference in Hardness of Rubber Between 20° C. and at −10° C.)

The hardness of each obtained vulcanized rubber specimen was measured at 20° C. and at −10° C. by use of a durometer Type A in accordance with JIS K6253. The difference in the hardness of the rubber between the two temperature conditions was calculated for each obtained vulcanized rubber specimen. Table 2 shows each obtained difference in the hardness of the rubber between the two temperature conditions in a way that: the difference in the hardness of a rubber according to Comparative Example 1 was indexed at 100; and the difference in the hardness of a rubber according to each of the examples and the other comparative examples was indicated as compared with the difference in the hardness of the rubber according to Comparative Example 1. A smaller index number means a better rubber characteristic in which it is difficult for the rubber to harden at low temperature.

Frictional Force on Ice (at −1.5° C.)

Each obtained vulcanized rubber specimen was pasted to a rubber board shaped like an elliptical column, and its coefficient of friction on ice was measured by use of an inside drum-type abrasion tester for measuring a frictional force on ice. The measurement temperature was set at −1.5° C.; the load was set at 0.54 MPa; and the rotational speed of the drum was set at 25 Km/h. Table 2 shows the obtained coefficient of friction on ice of each vulcanized rubber specimen as its frictional force on ice in a way that: the coefficient of friction on ice of a vulcanized rubber specimen according to Comparative Example 1 was indexed at 100; and the coefficient of friction on ice of a vulcanized rubber specimen according to each of the examples and the other comparative examples was indexed as compared with the coefficient of friction on ice of the vulcanized rubber specimen according to Comparative Example 1. A larger index number means a better frictional force on ice.

Abrasion Resistance

The abrasion loss of each obtained vulcanized rubber specimen was measured by use of a Lambourn abrasion tester (manufactured by Iwamoto Seisakusho) with a condition that: a temperature was set at 20° C.; a load was set at 39N; a slip ratio was set at 30%; and a time length was set at 4 minutes. Table 2 shows the obtained result in a way that: the inverse number of a value representing the measurement according to Comparative Example 1 was indexed at 100; and the inverse number of a value representing the measurement according to each of the examples and the other comparative examples was indexed as compared with the inverse number of a value representing the measurement according to Comparative Example 1. A larger index number means a better abrasion resistance.

TABLE 2

| Composition of rubber | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| NR | pts. wt. | 50 | 50 | 50 | 50 | 50 | 50 | 50 | 50 | 50 | 50 |
| BR | pts. wt. | 50 | 50 | 50 | 50 | 50 | 50 | 50 | 50 | 50 | 50 |
| Carbon black | pts. wt. | 25 | 25 | 25 | 5 | 25 | 25 | 25 | 25 | 25 | 50 |
| Silica | pts. wt. | 30 | 30 | 30 | 50 | 30 | 30 | 30 | 30 | 30 | 5 |
| Silane coupling agent | pts. wt. | 2.4 | 2.4 | 2.4 | 4.0 | 2.4 | 2.4 | 2.4 | 2.4 | 2.4 | 0.4 |
| Microcapsule-1 | pts. wt. | 3 | 5 | 20 | 3 | | | | 0.3 | 30 | 3 |
| Microcapsule-2 | pts. wt. | | | | | | | | 3 | | |
| Microcapsule-3 | pts. wt. | | | | | | | 3 | | | |
| Microcapsule-4 | pts. wt. | | | | | | 3 | | | | |
| Zinc oxide | pts. wt. | 4 | 4 | 4 | 4 | 4 | 4 | 4 | 4 | 4 | 4 |
| Stearic acid | pts. wt. | 2 | 2 | 2 | 2 | 2 | 2 | 2 | 2 | 2 | 2 |
| Antioxidant | pts. wt. | 2 | 2 | 2 | 2 | 2 | 2 | 2 | 2 | 2 | 2 |
| Aromatic oil | pts. wt. | 20 | 20 | 20 | 20 | 20 | 20 | 20 | 20 | 20 | 20 |
| Sulfur | pts. wt. | 1.5 | 1.5 | 1.5 | 1.5 | 1.5 | 1.5 | 1.5 | 1.5 | 1.5 | 1.5 |
| Vulcanization accelerator | pts. wt. | 1.5 | 1.5 | 1.5 | 1.5 | 1.5 | 1.5 | 1.5 | 1.5 | 1.5 | 1.5 |
| Proportion of area occupied by cells | % | 8 | 11 | 26 | 11 | 5 | 4 | 17 | 1 | 36 | 7 |
| Average particle diameter of post-expanded microcapsule | μm | 58 | 63 | 59 | 61 | 88 | 38 | 83 | 57 | 62 | 61 |
| Difference in hardness of rubber at low temperature | index | 99 | 97 | 100 | 89 | 100 | 101 | 100 | 100 | 103 | 116 |
| Frictional force on ice | index | 103 | 107 | 105 | 110 | 100 | 90 | 105 | 88 | 117 | 101 |
| abrasion resistance | index | 100 | 98 | 96 | 99 | 100 | 100 | 91 | 102 | 87 | 101 |

The symbol of "pts. wt." in Table 2 means "parts by weight".

The types of the raw materials listed in Table 2 will be shown below.

NR (natural rubber): RSS#3

BR (butadiene rubber): Nipol BR1220 manufactured by Zeon Corporation

Carbon black: Seast 6 manufactured by Tokai Carbon Co., Ltd.

Silica: Nipsil AQ manufactured by Nippon Silica Industrial Co., Ltd.

Silane coupling agent: Si69 manufactured by Degussa Japan Co., Ltd.

Microcapsules-1 to Microcapsules-4: microcapsules of types 1 to 4 prepared by use of the respective foregoing methods Zinc oxide: Zinc Oxide Type 3 manufactured by Seido Chemical Industry Co. Ltd.

Stearic acid: STEARIC ACID manufactured by Nihon Yushi Co., Ltd.

Antioxidant: SANTOFLEX 6PPD manufactured by Flexsys

Aromatic oil: Extract No. 4S manufactured by Showa Shell Sekiyu K.K.
Sulfur: Kinka-jirushi Abura-iri Fine Powdered Sulfur manufactured by Tsurumi Kagaku Kogyo Kabushiki Kaisha
Vulcanization accelerator: Nocceler CZ-G manufactured by Ouchi Shinko Chemical Industrial Co., Ltd.

What is claimed is:

1. A pneumatic tire comprising:
   tread rubber made from a rubber composition containing 100 parts by weight of a diene rubber, 30 to 100 parts by weight of a reinforcing filler including at least 10 parts by weight of silica, and 1 to 20 parts by weight of microcapsules each encapsulating a heat-expandable substance,
   the rubber composition containing a sulfur-containing silane coupling agent in an amount of 3 to 15 wt. % based on the weight of the silica;
   each microcapsule comprising a shell material made of a thermoplastic resin obtained by polymerizing together a nitrile monomer (I) in a major proportion and a monomer (II) having an unsaturated double bond and a carboxyl group in its molecule;
   the heat-expandable substance having a vapor pressure of 1.4 to 3.0 MPa at 150° C.;
   the microcapsules having an average particle diameter of 20 to 30 μm before vulcanization of the rubber composition;
   the microcapsules as expanded due to the vulcanization having an average particle diameter of 40 to 80 μm; and
   the tread rubber having a proportion of a cell-occupying area of 5 to 30%.

2. The pneumatic tire according to claim 1, wherein the shell material of each microcapsule is made of the thermoplastic resin which further contains, as a monomer, a monomer (III) having at least two polymerizable double bonds and/or a copolymerizable monomer (IV).

3. The pneumatic tire according to claim 1, wherein the nitrile monomer (I) is at least one selected from acrylonitrile, methacrylonitrile, α-chloroacrylonitrile, α-ethoxy acrylonitrile and fumaronitrile.

4. The pneumatic tire according to claim 1, wherein the monomer (II) having an unsaturated double bond and a carboxyl group in its molecule is at least one selected from an acrylic acid, a methacrylic acid, an itaconic acid, a maleic acid, a fumaric acid and a citraconic acid.

5. The pneumatic tire according to claim 2, wherein the monomer (III) having at least two polymerizable double bonds is at least one selected from divinylbenzene, divinylnaphthalene, allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, polyethylene glycol (PEG#200) di(meth)acrylate with a weight average molecular weight of 200, polyethylene glycol (PEG#400) di(meth)acrylate with a weight average molecular weight of 400, 1,6-hexanediol (meth)acrylate, and trimethylolpropane trimethacrylate.

6. The pneumatic tire according to claim 2, wherein the copolymerizable monomer (IV) is at least one selected from: vinylidene chloride; vinyl acetate; (meth)acrylate esters including methyl (meth)acrylate, ethyl (meth)acrylate, n-butyl (meth)acrylate, isobutyl (meth)acrylate and t-butyl (meth)acrylate; styrene; styrene sulfonate; α-methyl styrene; chlorostyrene; acrylamide; a substituted acrylamide; methacrylamide; and a substituted methacrylamide.

7. The pneumatic tire according to claim 1, wherein the heat-expandable substance is at least one selected from the group consisting of isoalkanes and normal alkanes.

8. The pneumatic tire according to claim 1, wherein the sulfur-containing silane coupling agent is at least one selected from bis-(3-triethoxysilylpropyl)tetrasulfide, bis(3-triethoxysilylpropyl)disulfide, and 3-trimethoxysilylpropyl benzothiazole tetrasulfide.

* * * * *